United States Patent
Kim et al.

(10) Patent No.: US 10,707,937 B2
(45) Date of Patent: Jul. 7, 2020

(54) METHOD BY WHICH TERMINAL RECEIVES DOWNLINK SIGNAL FROM BASE STATION IN WIRELESS COMMUNICATION SYSTEM, AND DEVICE THEREFOR

(71) Applicant: LG ELECTRONICS INC., Seoul (KR)

(72) Inventors: Hyungtae Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 16/067,473

(22) PCT Filed: Jan. 5, 2017

(86) PCT No.: PCT/KR2017/000149
§ 371 (c)(1),
(2) Date: Jun. 29, 2018

(87) PCT Pub. No.: WO2017/119741
PCT Pub. Date: Jul. 13, 2017

(65) Prior Publication Data
US 2019/0013854 A1    Jan. 10, 2019

Related U.S. Application Data
(60) Provisional application No. 62/276,233, filed on Jan. 8, 2016.

(51) Int. Cl.
*H04B 7/06* (2006.01)
*H04B 7/02* (2018.01)
(Continued)

(52) U.S. Cl.
CPC ............. *H04B 7/0626* (2013.01); *H04B 7/02* (2013.01); *H04B 7/0456* (2013.01); *H04B 7/06* (2013.01);
(Continued)

(58) Field of Classification Search
CPC ... H04L 5/0048; H04L 5/0035; H04L 5/0053; H04L 25/0202; H04L 1/0026; H04B 7/0626; H04B 7/024; H04W 24/10
See application file for complete search history.

(56) References Cited

U.S. PATENT DOCUMENTS

2014/0119266 A1   5/2014   Ng et al.
2015/0201369 A1*  7/2015   Ng .................. H04W 48/16
                                         370/254
(Continued)

FOREIGN PATENT DOCUMENTS

EP    2654333 A1    10/2013
EP    2897314 A1    7/2015
(Continued)

OTHER PUBLICATIONS

Alcatel-Lucent Shanghai Bell et al., "Remaining Issues of QCL and MR," 3GPP TSG RAN WG1 Meeting #83, R1-156713, Aanheim, US, Nov. 15-22, 2015, 7 pages.
(Continued)

*Primary Examiner* — Marsha D Banks Harold
*Assistant Examiner* — Elton Williams
(74) *Attorney, Agent, or Firm* — Birch, Stewart, Kolasch & Birch, LLP

(57) ABSTRACT

A method by which a terminal receives a downlink signal in a wireless access system is disclosed. The method comprises the steps of: receiving information on a plurality of channel status information (CSI) processes including two or more CSI-reference signals (CSI-RSs); receiving a downlink con-
(Continued)

trol signal including an indicator indicating a specific CSI-RS; selecting a quasi co-located (QCL) CSI process in which the specific CSI-RS is configured as a representative CSI-RS from among the plurality of CSI processes; selecting, as a QCL CSI-RS or a demodulation reference signal (DM-RS), a CSI-RS corresponding to the most recently reported CSI-RS indicator from among the two or more CSI-RSs included in the QCL CSI process; and receiving a downlink data signal by using the DM-RS and the QCL CSI-RS.

10 Claims, 9 Drawing Sheets

(51) Int. Cl.
  *H04L 1/06* (2006.01)
  *H04L 5/00* (2006.01)
  *H04B 7/0456* (2017.01)
  *H04W 72/04* (2009.01)
(52) U.S. Cl.
  CPC ............ *H04B 7/0639* (2013.01); *H04L 1/06* (2013.01); *H04L 5/00* (2013.01); *H04L 5/0023* (2013.01); *H04L 5/0035* (2013.01); *H04L 5/0048* (2013.01); *H04W 72/0406* (2013.01)

(56) References Cited

U.S. PATENT DOCUMENTS

| | | |
|---|---|---|
| 2015/0289235 A1 | 10/2015 | Park et al. |
| 2016/0036571 A1 | 2/2016 | Park et al. |
| 2016/0105817 A1* | 4/2016 | Frenne ................ H04B 7/0626 370/252 |
| 2016/0142189 A1* | 5/2016 | Shin ..................... H04B 7/0626 370/329 |

FOREIGN PATENT DOCUMENTS

| | | |
|---|---|---|
| WO | WO 2015/016582 A1 | 2/2015 |
| WO | WO 2015/023647 A1 | 2/2015 |

OTHER PUBLICATIONS

Samsung, "Discussion on QCL assumptions for FD-MIMO," 3GPP TSG RAN WG1 Meeting #83, R1-156779, Anaheim, CA, USA, Nov. 16-20, 2015, pp. 1-5.

* cited by examiner (a)

(b)

Antenna element                    Antenna port

METHOD BY WHICH TERMINAL RECEIVES DOWNLINK SIGNAL FROM BASE STATION IN WIRELESS COMMUNICATION SYSTEM, AND DEVICE THEREFOR

CROSS REFERENCE TO RELATED APPLICATIONS

This application is the National Phase of PCT International Application No. PCT/KR2017/000149, filed on Jan. 5, 2017, which claims priority under 35 U.S.C. 119(e) to U.S. Provisional Application No. 62/276,233, filed on Jan. 8, 2016, all of which are hereby expressly incorporated by reference into the present application.

TECHNICAL FIELD

The present invention relates to a wireless communication system, and more particularly, to a method of receiving a downlink signal by a user equipment from a base station in a wireless communication system and apparatus therefor.

BACKGROUND ART

MIMO (multi-input multi-output) technology corresponds to a technology for increasing data transmission and reception efficiency using a plurality of transmission antennas and a plurality of reception antennas instead of using a single transmission antenna and a single reception antenna. If a single antenna is used, a receiving end receives data through a single antenna path. On the contrary, if multiple antennas are used, the receiving end receives data through several paths, thereby enhancing transmission speed and transmission capacity and increasing coverage.

A single-cell MIMO operation can be divided into a single user-MIMO (SU-MIMO) scheme that a single user equipment (UE) receives a downlink signal in a single cell and a multi user-MIMO (MU-MIMO) scheme that two or more UEs receive a downlink signal in a single cell.

Channel estimation corresponds to a procedure of restoring a received signal by compensating a distortion of the signal distorted by fading. In this case, the fading corresponds to a phenomenon of rapidly changing strength of a signal due to multi-path time delay in wireless communication system environment. In order to perform the channel estimation, it is necessary to have a reference signal known to both a transmitter and a receiver. The reference signal can be simply referred to as an RS (reference signal) or a pilot depending on a standard applied thereto.

A downlink reference signal corresponds to a pilot signal for coherently demodulating PDSCH (physical downlink shared channel). PCFICH (physical control format indicator channel), PHICH (physical hybrid indicator channel). PDCCH (physical downlink control channel) and the like. A downlink reference signal can be classified into a common reference signal (CRS) shared by all UEs within a cell and a dedicated reference signal (DRS) used for a specific UE only. Compared to a legacy communication system supporting 4 transmission antennas (e.g., a system according to LTE release 8 or 9 standard), a system including an extended antenna configuration (e.g., a system according to LTE-A standard supporting 8 transmission antennas) is considering DRS-based data demodulation to efficiently manage a reference signal and support an enhanced transmission scheme. In particular, in order to support data transmission through an extended antenna, it may be able to define a DRS for two or more layers. Since a DRS and data are precoded by a same precoder, it is able to easily estimate channel information, which is used for a receiving end to demodulate data, without separate precoding information.

Although a downlink receiving end is able to obtain precoded channel information on an extended antenna configuration through a DRS, it is required for the downlink receiving end to have a separate reference signal except the DRS to obtain channel information which is not precoded. Hence, it is able to define a reference signal for obtaining channel state information (CSI), i.e., a CSI-RS, at a receiving end in a system according to LTE-A standard.

DISCLOSURE OF THE INVENTION

Technical Task

Based on the aforementioned discussion, the technical task of the present invention is to propose a method of receiving a downlink signal by a user equipment from a base station in a wireless communication system and apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

In one technical aspect of the present invention, provided herein is a method of receiving a downlink signal by a user equipment in a wireless access system, including receiving information on a plurality of CSI (channel status information) processes including two or more CSI-RSs (channel status information-reference signals), receiving a downlink control signal including an indicator indicating a specific CSI-RS, selecting a QCL (quasi co-located) CSI process having the specific CSI-RS set as a representative CSI-RS from a plurality of the CSI processes, selecting a CSI-RS corresponding to a most recently reported CSI-RS indicator as a QCL CSI-RS of a DM-RS (demodulation-reference signal) from the two or more CSI-RSs included in the QCL CSI process, and receiving a downlink data signal using the DM-RS and the QCL CSI-RS.

In another technical aspect of the present invention, provided herein is a user equipment in a wireless communication system, including a wireless communication module and a processor configured to receive information on a plurality of CSI (channel status information) processes including two or more CSI-RSs (channel status information-reference signals), receive a downlink control signal including an indicator indicating a specific CSI-RS, select a QCL (quasi co-located) CSI process having the specific CSI-RS set as a representative CSI-RS from a plurality of the CSI processes, select a CSI-RS corresponding to a most recently reported CSI-RS indicator as a QCL CSI-RS of a DM-RS (demodulation-reference signal) from the two or more CSI-RSs included in the QCL CSI process, and receive a downlink data signal using the DM-RS and the QCL CSI-RS.

According to the present invention, a plurality of the CSI processes correspond to different TPs (transmission points) and the DM-RS and the QCL CSI-RS are equal to each other in a Doppler spread, a Doppler shift, an average delay and a delay spread.

Preferably, the representative CSI-RS may have a smallest index among the two or more CSI-RSs included in the corresponding CSI process.

Additionally, an index of a subframe for reporting the CSI-RS indicator precedes an index of a subframe for receiving the downlink control signal with a preset value.

More preferably, the downlink control signal includes a flag of a 1-bit size. Here, if the flag is a first value, the CSI-RS corresponding to the most recently reported CSI-RS indicator among the two or more CSI-RSs included in the QCL CSI process is selected as the QCL CSI-RS of the CM-RS. If the flag is a second value, the specific CSI-RS is selected as the QCL CSI-RS of the DM-RS.

Advantageous Effects

According to an embodiment of the present invention, a user equipment can efficiently receive a downlink signal based on a beamformed reference signal from a base station in a wireless communication system, and more particularly, in a 3D MIMO applied wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
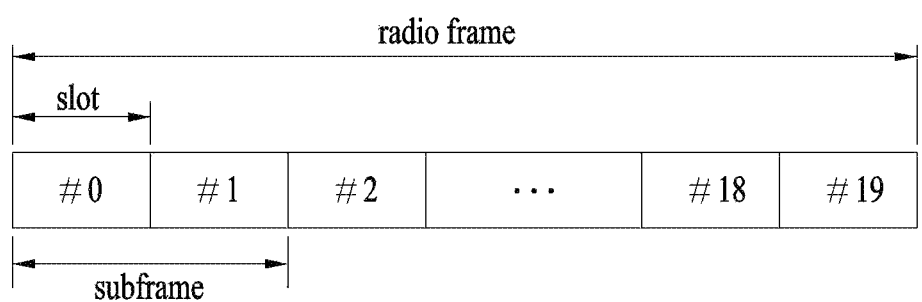
FIG. 1 is a diagram for a structure of a downlink radio frame.

The embodiments described in the following correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this specification, embodiments of the present invention are described centering on the data transmission/reception relations between a user equipment and an eNode B. In this case, the eNode B may correspond to a terminal node of a network directly performing communication with the user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like. A terminal may be substituted with such a terminology as a relay node (RN), a relay station (RS), and the like. And, a terminal may be substituted with such a terminology as a user equipment (UE), a mobile station (MS), a mobile subscriber station (MSS), and the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure of a downlink radio frame is explained in the following with reference to FIG. 1.

Referring to FIG. 1, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1 is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol period. The OFDM symbol may be referred to as SC-FDMA symbol or symbol period. The resource block (RB) as a resource allocation unit may include a plurality of continuous subcarriers in one slot.

The number of OFDM symbols included in one slot may vary depending on a configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

The aforementioned structure of a radio frame is just an example only. The number of subframes included in a radio frame, the number of slots included in a subframe and the number of symbols included in a slot may be modified in various ways.

Figure 2:
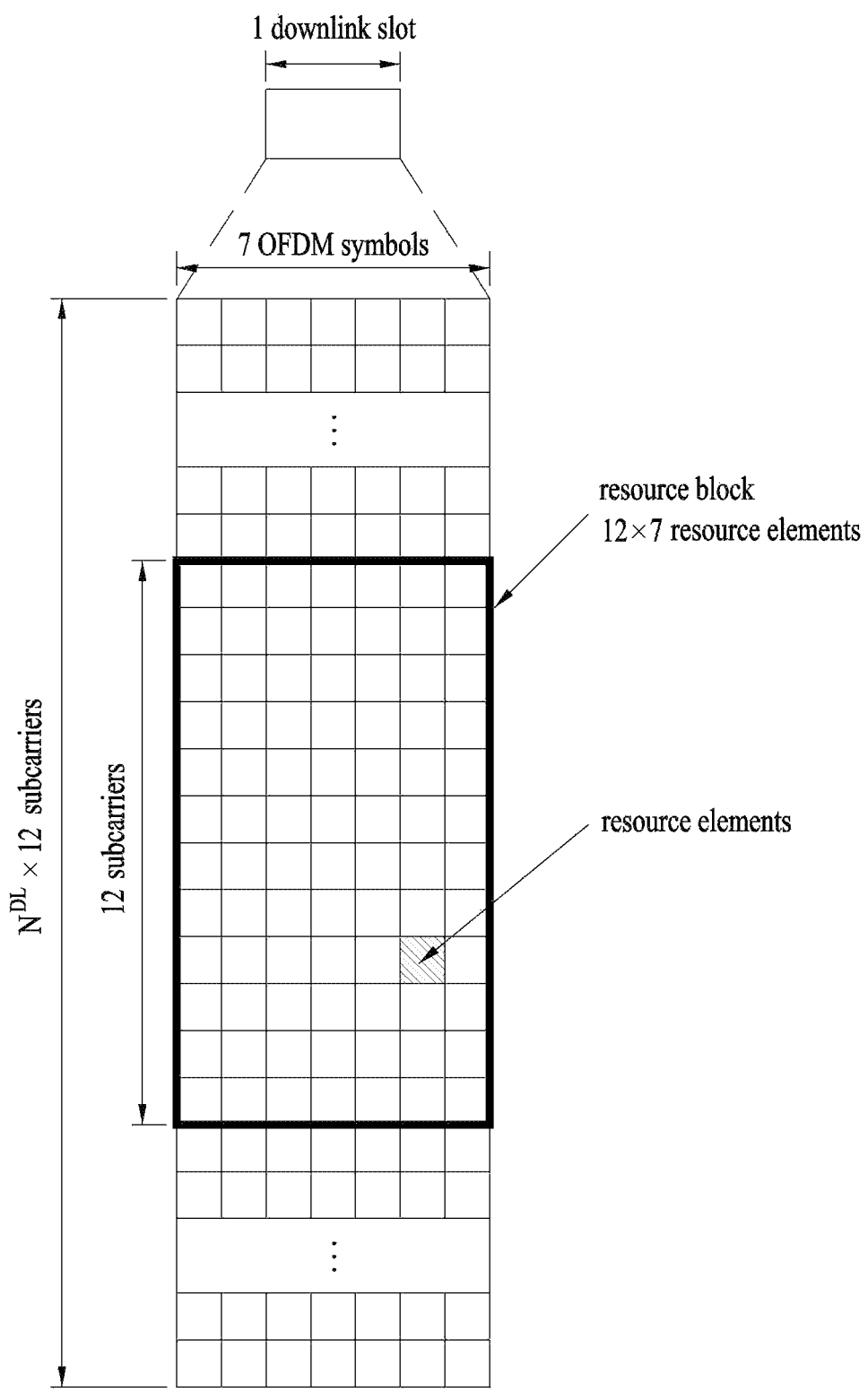
FIG. 2 is a diagram for an example of a resource grid of a downlink slot.

FIG. 2 is a diagram for an example of a resource grid of a downlink slot. FIG. 2 shows a case that an OFDM symbol is configured by a normal CP. Referring to FIG. 2, a downlink slot includes a plurality of OFDM symbols in a time domain and a plurality of resource blocks in a frequency domain. In this case, although FIG. 2 illustrates that a downlink slot includes seven OFDM symbols and a resource block includes twelve subcarriers, by which the present invention may be non-limited. Each element on the resource grid will be referred to as a resource element (RE). For example, an RE a (k, l) may correspond to an RE positioned at a kth subcarrier and an lth OFDM symbol. In case of a normal CP, one resource block includes 12*7 resource elements (in case of an extended CP, one resource block includes 12*6 resource elements). Since a space between subcarriers corresponds to 15 kHz, one resource block includes about 180 kHz in frequency domain. NDL corresponds to the number of resource blocks included in a downlink slot. A value of the NDL can be determined according to a downlink transmission bandwidth scheduled by a base station.

Figure 3:
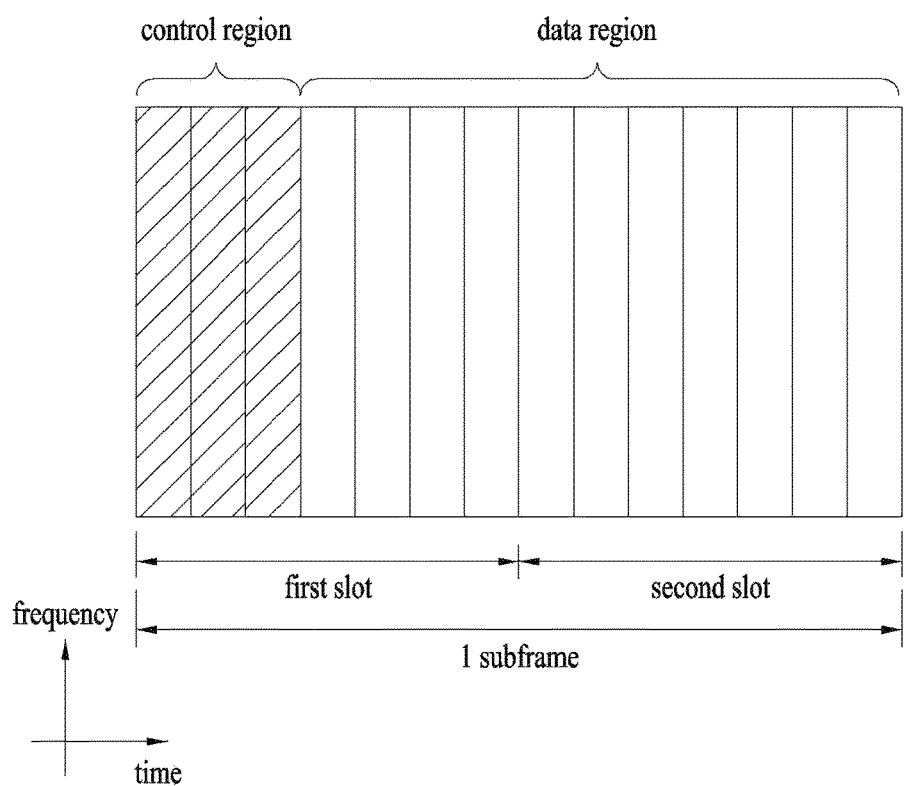
FIG. 3 is a diagram for structure of a downlink subframe.

FIG. 3 is a diagram illustrating a structure of a downlink subframe. Referring to FIG. 3, maximum three OFDM symbols located at the front of the first slot of a subframe correspond to a control region to which a control channel is allocated. The other OFDM symbols correspond to a data region to which a physical downlink shared channel (PDSCH) is allocated. A basic unit of transmission becomes one subframe. In particular, PDCCH and PDSCH are assigned over two slots. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK signals in response to uplink transmission. The control information transmitted through the PDCCH will be referred to as downlink control information (DCI). The DCI includes uplink or downlink scheduling information, uplink transmission (Tx) power control command for a random UE group and the like. The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on a correlation between the number of CCEs and a coding rate provided by the CCE. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH.

For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 4:
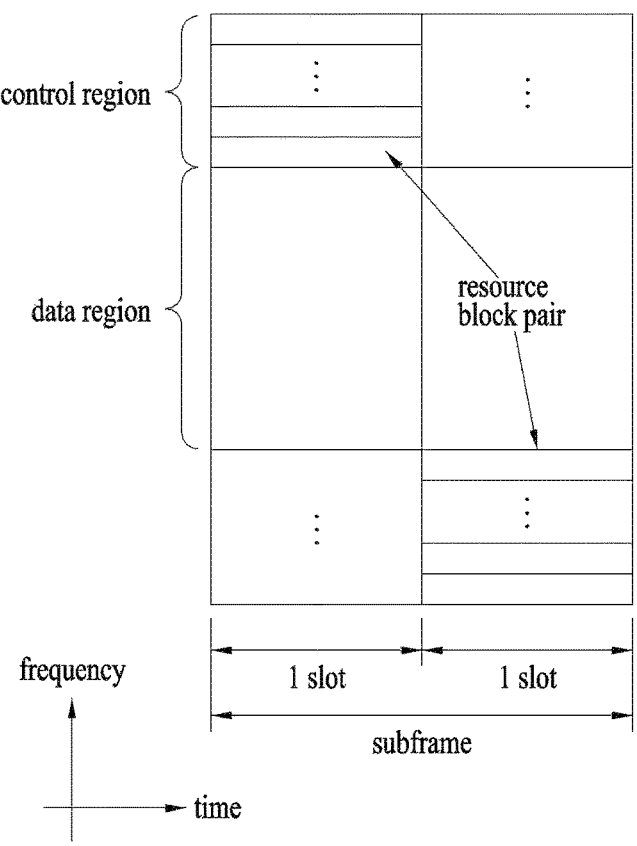
FIG. 4 is a diagram for structure of an uplink subframe.

FIG. 4 is a diagram for structure of an uplink subframe. Referring to FIG. 4, a UL subframe may be divided into a control region and a data region in a frequency domain. A physical uplink control channel (PUCCH) including uplink control information is allocated to the control region and a physical uplink shared channel (PUSCH) including user data is allocated to the data region. In order to maintain single carrier property, a UE does not transmit the PUCCH and the PUSCH at the same time. The PUCCH for one UE is allocated to a resource block pair in a subframe. The resource blocks belonging to the resource block pair occupy a different subcarrier with respect to two slots. This is represented as the resource block pair allocated to the PUCCH is frequency-hopped at a slot boundary.

MIMO System Modeling

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 5:
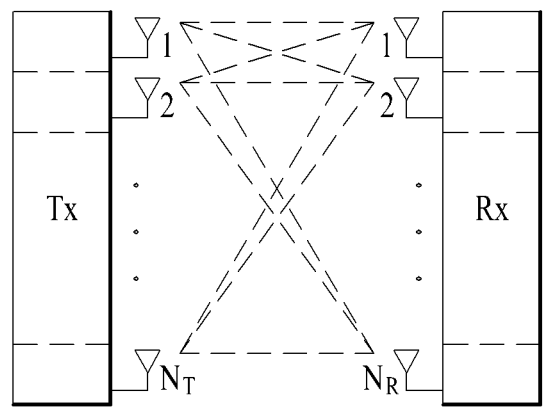
FIG. 5 is a diagram for a configuration of a wireless communication system including a plurality of antennas.
Figure 5:
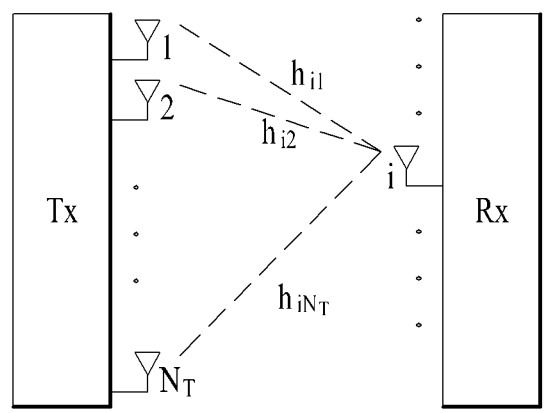

FIG. 5 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 5. Regarding a transmission signal, up to $N_T$ pieces of information can be transmitted through the $N_T$ Tx antennas, as expressed as the following vector.

$$s = [s_1, s_2, \Lambda, s_{N_T}]^T \quad \text{[Equation 2]}$$

Individual pieces of the transmission information $s_1$, $s_2$, ..., $s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \Lambda, \hat{s}_{N_T}]^T = [P_1 s_1, P_2 s_2, \Lambda, P_{N_T} s_{N_T}]^T \quad \text{[Equation 3]}$$

The transmission power-controlled transmission information vector $\hat{s}$ may be expressed below, using a diagonal matrix p of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

*78

Meanwhile, $N_T$ transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \qquad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \qquad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

CSI Feedback

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \qquad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \qquad \text{[Equation 9]}$$

where $X_i$ is $Nt/2$ by $M$ matrix.

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r\,columns}$$

(if rank = $r$), where $1 \leq k, l, m \leq M$ and $k, l, m$ are integer where Nt is the number of Tx antennas, M is the number of columns of a matrix Xi, indicating that the matrix Xi includes a total of M candidate column vectors. eMk, eMl, and eMm denote k-th, l-th, and m-th column vectors of the matrix Xi in which only k-th, l-th, and m-th elements among M elements are 0 and the other elements are 0, respectively. $\alpha_j$, $\beta_j$, and $\gamma_j$ are complex values each having a unit norm and indicate that, when the k-th, l-th, and m-th column vectors of the matrix Xi are selected, phase rotation is applied to the column vectors. At this time, i is an integer greater than 0, denoting a PMI index indicating W1 and j is an integer greater than 0, denoting a PMI index indicating W2.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix} \qquad \text{[Equation 10]}$$

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively.

$X_i(k)$ is expressed as a vector having the linear phase increment property, reflecting the correlation characteristics between antennas in each antenna group. For example, a discrete Fourier transform (DFT) matrix may be used for $X_i(k)$.

As mentioned in the foregoing description, channel state information (CSI) includes CQI, PMI, RI, and the like in LTE system. All or a part of the CQI, the PMI, and the RI is transmitted depending on a transmission mode of a UE. When the CSI is periodically transmitted, it is referred to as periodic reporting. When the CSI is transmitted upon the request of a base station, it is referred to as aperiodic reporting. In case of the aperiodic reporting, a request bit, which is included in uplink scheduling information transmitted by a base station, is transmitted to a UE. The UE forwards CSI to the base station via a data channel (PUSCH) in consideration of a transmission mode of the UE. In case of the periodic reporting, a period and an offset in the period are signaled in a unit of a subframe according to a UE using a semi-static scheme via higher layer signaling. A UE forwards CSI to a base station via an uplink control channel (PUCCH) according to a determined period in consideration of a transmission mode. If uplink data exists at the same time in a subframe in which CSI is transmitted, the CSI is transmitted via an uplink data channel (PUSCH) together with the data. The base station transmits transmission timing information appropriate for a UE to the UE in consideration of a channel status of each UE, a UE distribution status in a cell, and the like. The transmission timing information includes a period for transmitting CSI, offset, and the like and can be transmitted to each UE via an RRC message.

LTE system includes 4 types of CQI reporting mode. Specifically, the CQI reporting mode is divided into WB CQI and SB CQI according to a CQI feedback type and is divided into no PMI and single PMI depending on whether PMI is transmitted or not. In order to periodically report CQI, each UE receives information consisting of a combination of a period and an offset via RRC signaling.

CSI reporting types defined in LTE release-10 are described in the following.

A type 1 report supports CQI feedback for a UE on a selected subband. A type 1a report supports subband CQI and second PMI feedback. A type 2, a type 2b, and a type 2c reports support wideband CQI and PMI feedback. A type 2a report supports wideband PMI feedback. A type 3 report supports RI feedback. A type 4 report supports wideband CQI. A type 5 report supports RI and wideband PMI feedback. A type 6 report supports RI and PTI (precoding type indicator) feedback.

CoMP (Coordinated Multi Point) Transmission Scheme

Meanwhile, in the LTE-S system that is the standard of the next generation mobile communication system, it is expected to support CoMP (coordinated multi point) transmission scheme, which is not supported by the existing standard, for data transmission rate improvement. Here, the CoMP transmission scheme means a transmission scheme for two or more base stations or cells to communicate with a user equipment (UE) cooperatively to improve performance of communication between a UE in a radio shadow area and a base station (a cell or sector).

CoMP transmission schemes may be classified into CoMP-joint processing (CoMP-JP) of cooperative MIMO characterized by data sharing and CoMP-coordinated scheduling/beam forming (CoMP-CS/CB).

In DL CoMP-JP, a UE may instantaneously receive data simultaneously from base stations that perform CoMP transmission and may combine the received signals, thereby increasing reception performance (joint transmission (JT)). In addition, one of the base stations participating in CoMP transmission may transmit data to the UE at a specific time point (dynamic point selection (DPS)).

In contrast, in CoMP-CS/CB, a UE may receive data instantaneously from one base station, that is, a serving base station by beamforming.

In UL CoMP-JP, base stations may receive a PUSCH signal simultaneously from a UE (joint reception (JR)). In contrast, in CoMP-CS/CB, only one base station receives a PUSCH. Herein, cooperative cells (or base stations) may make a decision as to whether to use CoMP-CS/CB.

When the aforementioned CoMP scheme is applied, a UE may receive a multitude of CSI-RS configurations through RRC layer signaling. Each CSI-RS configuration is defined as Table 1. Referring to Table 1, it can be observed that information on a CRS capable of QCL (quasi co-location) assumption per CSI-RS configuration is included.

TABLE 1

| CSI-RS-ConfigNZP information elements |
|---|
| -- ASN1START<br>CSI-RS-ConfigN2P-r11 ::=    SEQUENCE {<br>  csi-RS-ConfigNZPId-r11        CSI-RS-ConfigNZPId-r11,<br>  antennaPortsCount-r11         ENUMERATED {an1, an2, an4, an8},<br>  resourceConfig-r11            INTEGER (0..31),<br>  subframeConfig-r11            INTEGER (0..154),<br>  scramblingIdentity-r11        INTEGER (0...503),<br>  qcl-CRS-Info-r11              SEQUENCE {<br>    qcl-ScramblingIdentity-r11    INTEGER (0..503),<br>    crs-PortsCount-r11            ENUMERATED {n1, n2, n4, spare1},<br>    mbsfn-SubframeConfigList-r11  CHOICE {<br>      release                       NULL,<br>      setup                         SEQUENCE {<br>        subframeConfigList            MBSFN-SubframeConfigList<br>      }<br>    }                             OPTIONAL  -- Need ON<br>  }                               OPTIONAL, -- Need OR<br>  ...<br>}<br>-- ASN1STOP |

Meanwhile, in the recent 3GPP LTE-A standard, for transmission mode 10 that is a PDSCH transmission of CoMP, a PQI (PDSCH RE mapping and quasi-co-location indicator) field is defined in DCI format 2D. Particularly, the PQI field is defined in a 2-bit size and indicates total 4 states as Table 2. Information indicated by each state is a parameter set for receiving PDSCH of CoMP and specific values are signaled in advance through higher layers. Namely, for Table 2, total 4 parameter sets can be semi-statically signaled through RRC layer signals, and a PQI field of DCI format 2D indicates one of the total 4 parameter sets dynamically.

TABLE 2

| Value of 'PDSCH RE Mapping and Quasi-Co-Location Indicator' field | Description |
|---|---|
| '00' | Parameter set 1 configured by higher layers |
| '01' | Parameter set 2 configured by higher layers |

TABLE 2-continued

| Value of 'PDSCH RE Mapping and Quasi-Co-Location Indicator' field | Description |
|---|---|
| '10' | Parameter set 3 configured by higher layers |
| '11' | Parameter set 4 configured by higher layers |

Information included in the parameter set includes at least one of the number of CRS antenna ports [crs-PortsCount], a frequency shift value of CRS [crs-FreqShift], an MBSFN subframe configuration [mbsfn-SubframeConfigList], a ZP CSI-RS configuration [csi-RS-ConfigZPId], a PDSCH start symbol [pdsch-Start], and a QCL (Quasi Co-Location) information of NZP (Non-ZP) CSI-RS [qcl-CSI-RS-ConfigNZPId].

QCL (Quasi Co-Location) between antenna ports is described as follows.

'Quasi co-located between antenna ports' means that large-scale properties of a signal received by a UE from a single antenna port (or a radio channel corresponding to the corresponding antenna port) can be assumed as identical to those of a signal received from the other antenna port entirely or in part. Here, the large-scale properties include Doppler spread associated with frequency offset, Doppler shift, associated with frequency offset, average delay associated with timing offset, delay spread associated with timing offset, and the like, and may further include average gain as well.

According to the above definition, a UE is unable to assume that large-scale properties are identical between NQCL (non-quasi co-located) antenna ports. In this case, the UE should independently perform a tracking procedure for obtaining frequency offset and timing offset per antenna port and the like.

On the other hand, a UE can advantageously perform the following operations between QCL (quasi co-located) antenna ports.

1) A UE can identically apply a power-delay profile, delay spread. Doppler spectrum and Doppler spread estimation result for a radio channel corresponding to a specific antenna port to a Wiener filter parameter used for channel estimation on a radio channel corresponding to another antenna port and the like.

2) After obtaining time synchronization and frequency synchronization for the specific antenna port, the UE can apply the same synchronizations to another antenna port.

3) Finally, with respect to an average gain, the UE can calculate an RSRP (reference signal received power) measurement value for each QCL antenna port into an average value.

For example, if the UE receives DM-RS based DL (downlink) data channel scheduling information, e.g., DCI format 2c through PDCCH (or E-PDCCH), the UE assumes a case of performing data demodulation after performing channel estimation on PDSCH through DM-RS sequence indicated by the scheduling information.

In such a case, if a DM-RS antenna port for DL data channel demodulation of the UE is quasi co-located with a CRS antenna port of a serving cell, the UE can improve DM-RS based DL data channel reception performance by intactly applying the large-scale properties of a radio channel estimated from a CRS antenna port of its own on channel estimation through the corresponding DM-RS antenna port.

Likewise, if a DM-RS antenna port for DL data channel demodulation of the UE is quasi co-located with a CRS antenna port of a serving cell, the UE can improve DM-RS based DL data channel reception performance by intactly applying the large-scale properties of a radio channel estimated from a CRS antenna port of the serving cell on channel estimation through the corresponding DM-RS antenna port.

Meanwhile, in the LTE system, when a DL signal is transmitted in transmission mode 10 that is a CoMP mode, it is defined that a base station configures one of QCL type A and QCL type B for a UE through a higher layer signal.

Here, the QCL type A assumes that antenna ports of CRS, DM-RS and CSI-RS quasi co-located in the rest of large-scale properties except an average gain and means that physical channel and signals are transmitted from the same node (point). On the other hand, regarding the QCL type B, maximum 4 QCL modes per UE are configured through a higher layer message to enable CoMP transmission such as DPS, JT and the like. And, which one of the 4 QCL modes is used to receive a DL signal is defined to be configured through DCI (downlink control information) dynamically.

DPS transmission in case of setting QCL type B is described in detail as follows.

First of all, a node #1 configured with $N_1$ antenna ports is assumed as transmitting CSI-RS resource #1, and a node #2 configured with $N_2$ antenna ports is assumed as transmitting CSI-RS resource #2. In this case, the CSI-RS resource #1 is included in parameter set #1 and the CSI-RS resource #2 is included in parameter set #2. Moreover, a base station configures the parameter set #1 and the parameter set #2 for a UE existing within a common coverage of the node #1 and the node #2 through a higher layer signal.

Thereafter, DPS can be performed in a manner that the base station configures the parameter set #1 for the corresponding UE using DCI in case of data (i.e., PDSCH) transmission through the node #1 and configures the parameter set #2 in case of data transmission through the node #2. In aspect of the UE, if the parameter set #1 is configured through DCI, it can assume that CSI-RS resource #1 and DM-RS are quasi co-located. If the parameter set #2 is configured through DCI, it can assume that CSI-RS resource #2 and DM-RS are quasi co-located.

Massive MIMO

A recent wireless communication system considers introducing an active antenna system (hereinafter, AAS). Unlike a legacy passive antenna system that an amplifier capable of adjusting a phase and a size of a signal is separated from an antenna, the AAS corresponds to a system that each antenna is configured as an active antenna including such an active circuit as an amplifier. Since the AAS uses an active antenna, it is not necessary for the AAS to have a separate cable for connecting an amplifier with an antenna, a connector, other hardware, and the like. Hence, the AAS has characteristics that efficiency is high in terms of energy and management cost. In particular, since the AAS supports an electronic beam control scheme according to each antenna, the AAS enables an evolved MIMO technique such as forming a delicate beam pattern in consideration of a beam direction and a beam width, forming a 3D beam pattern, and the like.

As the evolved antenna system such as the AAS and the like is introduced, a massive MIMO structure including a plurality of input/output antennas and multi-dimensional antenna structure are also considered. As an example, in case of forming a 2D antenna array instead of a legacy straight antenna array, it may be able to form a 3D beam pattern by the active antenna of the AAS.

Figure 6:
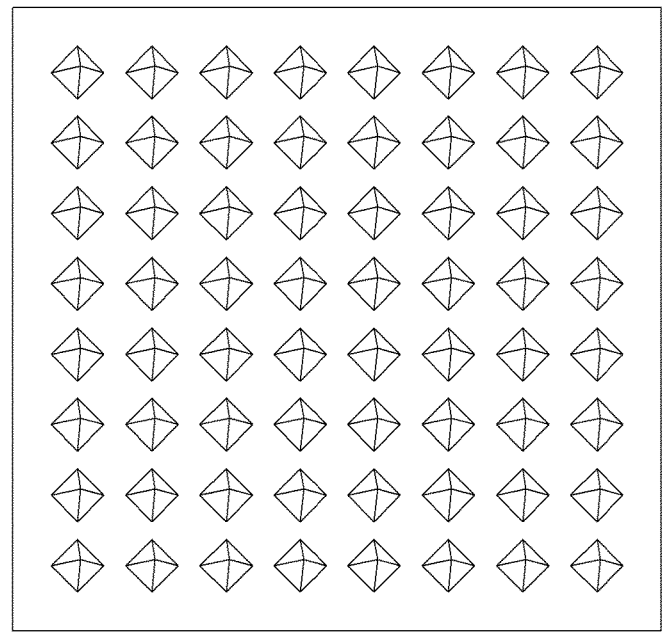
FIG. 6 illustrates a 2D active antenna system having 64 antenna elements.

FIG. 6 illustrates a 2D active antenna system having 64 antenna elements.

Referring to FIG. 6, it is able to see that $N_t = N_v \cdot N_h$ number of antennas forms a shape of square. In particular, $N_h$ and $N_v$ indicate the number of antenna columns in horizontal direction and the number of antenna rows in vertical direction, respectively.

If the 3D beam pattern is utilized in the aspect of a transmission antenna, it may be able to perform semi-static or dynamic beam forming not only in horizontal direction but also in vertical direction of a beam. As an example, it may consider such an application as sector forming in vertical direction and the like. In the aspect of a reception antenna, when a reception beam is formed using massive antennas, it may be able to expect a signal power increasing effect according to an antenna array gain. Hence, in case of uplink, an eNB is able to receive a signal transmitted from a UE through a plurality of antennas. In this case, in order to reduce interference impact, the UE can configure transmit power of the UE to be very low in consideration of a gain of massive reception antennas.

Figure 7:
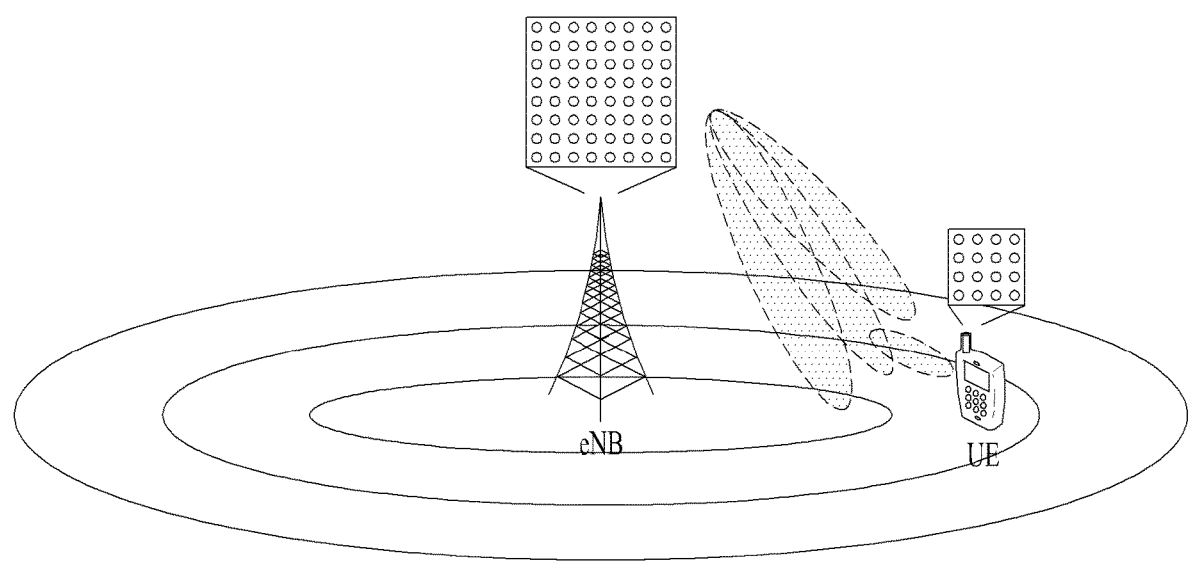
FIG. 7 illustrates a 3D-MIMO system utilizing 2D-AAS.

FIG. 7 illustrates a 3D-MIMO system utilizing 2D-AAS. In particular, FIG. 7 shows a system that an eNB or a UE has a plurality of transmission/reception antennas capable of forming an AAS-based 3D beam.

Meanwhile, an antenna port does not mean a substantial antenna element in the concept of a logical antenna. Hence, an antenna port may refer to a virtual antenna and an antenna element itself can refer to a physical antenna. A scheme of mapping each antenna port to a physical antenna element is a major factor in designing the entire MIMO system. As antenna mapping schemes, one-to-one mapping of mapping an antenna port to a single antenna element and one-to-many mapping of mapping an antenna port to a multitude of antenna elements can be considered.

Mapping from an antenna port to an antenna element is expressed as a virtualization matrix B in Equation 11. Here, x indicates a Tx (transmission) signal at an antenna port and z indicates a Tx signal at an antenna element. The number of antenna ports can be smaller than that of antenna elements. Yet, for clarity of description, considered is a case that the number of antenna ports is $N_t$. $b_n$ indicates a virtualization vector indicating the relation that an $n^{th}$ antenna port is mapped to antenna elements. If the number of non-zero element of the virtualization vector $b_n$ is 1, it means the one-to-one mapping scheme. If the number of non-zero elements of the virtualization vector $b_n$ is the multiple number, it means the one-to-many mapping scheme.

$$z = Bx = [b_0 b_1 \Lambda b_{N_t-1}] x. \qquad \text{[Equation 11]}$$

In Equation 11, in order to regard signal energy at an antenna port as equal to signal energy at an antenna element, a virtualization vector is assumed as normalized into $\|b_n\|=1$. Hereinafter, the relation between an antenna element and an antenna port is described in detail with reference to the accompanying drawing.

Figure 8:
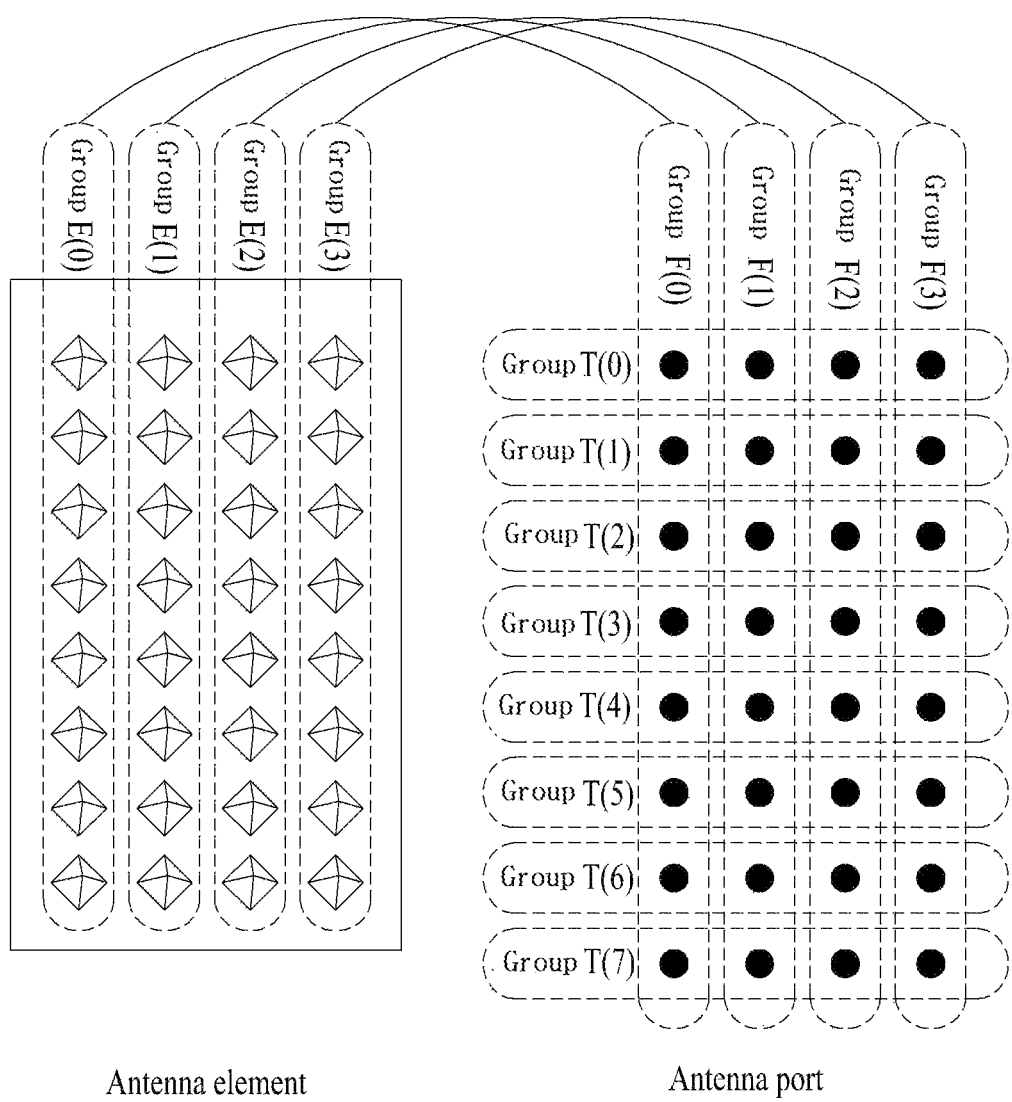
FIG. 8 is a diagram for a 2D-AAS model considering polarization characteristic of antenna array.

FIG. 8 is a diagram showing an example of relation between an antenna element and an antenna port in a 2D AAS system to which massive MIMO is applied. In particular, the left drawing of FIG. 8 shows total 32 antenna elements, i.e., 32 physical antennas, and the right drawing of FIG. 8 shows a logical antenna as 32 antenna ports.

In particular, FIG. 8 shows a grouping scheme of antenna elements and a grouping scheme of antenna ports, and also shows mapping between an antenna element and an antenna port. Referring to FIG. 8, it can be observed that antenna elements are grouped as antenna columns in vertical direction. Specifically, the antenna elements are divided into 4 groups including E(0), E(1), E(2), and E(3). And, the 32 antenna ports are also divided into 4 groups to form groups including F(0), F(1), F(2), and F(3).

In this case, antenna ports belonging to a group F(i) are virtualized using all antenna elements belonging to a group E(i). A virtualization vector of each antenna port belonging to the group F(i) is differently configured. One antenna port is selected from each antenna port group to form a group T(i). Each antenna port belonging to the group T(i) uses an identical virtualization vector to be mapped to a different antenna element group. An RS for each antenna port belonging to the group T(i) is transmitted in the same OFDM symbol.

In an FD-MIMO (full dimension-MIMO) system, a base station can configure several CSI-RS resources for a UE in a single CSI process. Here, the CSI process means an operation of feeding back channel information with an independent feedback configuration.

In this case, the UE does not consider a CSI-RS resource configured within a single CSI process as an independent channel, assumes a single huge CSI-RS resource by aggregating the corresponding CSI-RS resources, and calculates & feeds back CSI based on the huge CSI-RS resource. For example, the base station configures three 4-port CSI-RS resources within a signal CSI process for the UE, and the UE assumes a single 12-port CSI-RS resource by aggregating the three 4-port CSI-RS resources. The UE calculates and feeds back CSI using 12-port PMI based on this CSI-RS resource. Such a reporting mode is referred to as Class A CSI reporting in the LTE-A system.

Or, the UE assumes each of the CSI-RS resources as an independent channel, selects one of the CSI-RS resources, and then calculates & reports CSI on the basis of the selected resource. Namely, the UE selects a CSI-RS of a strong channel from the 8 CSI-RS resources, calculates CSI on the basis of the selected CSI-RS, and reports the CSI to the base station. In doing so, the UE additionally reports the selected CSI-RS to the base station via CRI (CSI-RS resource indicator). For example, if a channel of the first CSI-RS corresponding to T(0) is the strongest, the UE sets CRI=0 and then reports it to the base station. Such a reporting mode is referred to as Class B CSI reporting in the LTE-A system.

In order to effectively show the aforementioned characteristic, variables described in the following can be defined for a CSI process in Class B. K means the number of CSI-RS resources existing in the CSI process. $N_k$ means the number of CSI-RS ports of a $k^{th}$ CSI-RS resource. In FIG. 8, K is 8 (K=8) and $N_k$ is set to 4 irrespective of a value of k.

According to Release 13 of the current LTE-A standard, a CRI indicates a specific CSI-RS resource. Yet, in the future, a CRI shall be more specified as indicating a specific port combination with a specific CSI-RS. For example, a CRI can be specified as selecting one of 8 CSI-RSs within a CSI process and then selecting a combination of ports 15 and 16 within the selected CSI-RS additionally. If it is able to select either a combination of ports 15 and 16 or a combination of ports 17 and 18 from each CSI-RS, a CRI indicates one of 16 values. For example, a combination of ports 15 and 16 of a first CSI-RS, a combination of ports 17 and 18 of the first CSI-RS, a combination of ports 15 and 16 of a second CSI-RS, and a combination of ports 17 and 18 of the second CSI-RS are indicated as CRI=0, CRI=1, CRI=2, and CRI=3, respectively. Finally, a combination of ports 17 and 18 of the $8^{th}$ CSI-RS is mapped to CRI=15.

Figure 9:
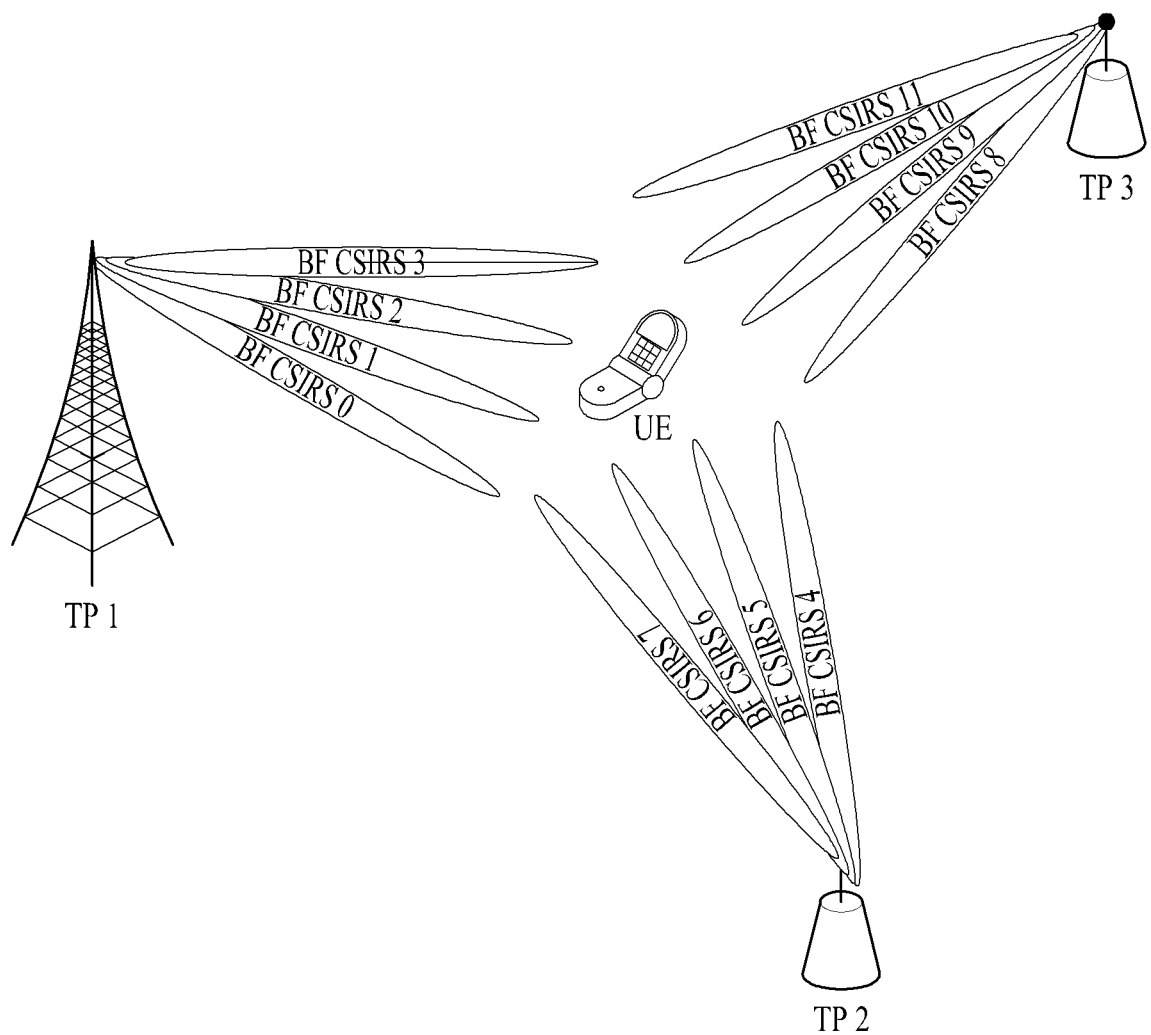
FIG. 9 shows an example of a DPS CoMP operation according to an embodiment of the present invention.

FIG. 9 shows an example of a DPS CoMP operation according to an embodiment of the present invention.

In FIG. 9, 3 TPs may include distributed antenna TPs sharing the same cell IR or separate cells having individual IDs. Particularly, FIG. 9 shows an FD-MIMO (full dimension-MIMO) system capable of using a 2D beam as each TP is equipped with a vertical/horizontal antenna.

Referring to FIG. 9, 4 BF (beamformed) CSI-RS resources per TP are shown to a COMP UE. As a result, total 12 BF CSI-RSs are configured for the UE. Or, there is a single CSI-RS resource shown to the UE by each TP. Ports configuring the single CSI-RS resource are divided into a plurality of port groups, whereby the UE can be informed of 4 port groups. Namely, in FIG. 9, the 4 CSI-RS resources transmitted by TP 1 are configured for the UE as a substantially single CSI-RS resource, CSI-RS 0 indicates a port group configured with some ports of the single CSI-RS resource, CSI-RS 1 indicates a port group configured with other some ports of the single CSI-RS resource, and so on.

Table 3 shows a CSI process configured for a UE, a TP index corresponding to each CSI process, and a BF CSI-RS index.

TABLE 3

| CSI process index | TP index | BF CSI-RS index |
|---|---|---|
| 0 | 0 | {0, 1, 2, 3} |
| 1 | 1 | {4, 5, 6, 7} |
| 2 | 2 | {8, 9, 10, 11} |

In Table 3, although a single CSI process per TP is configured for a UE, this is just exemplary. Two or more CSI processes per TP can be configured.

Since a size of a currently defined PQI field is 2 bits, a UE can be informed of maximum 4 CSI-RSs (i.e., QCLed CSI-RSs) for which QCL assumption with DM-RS is possible. Since the number of TPs participating in CoMP is limited to 3 in aspect of a single UE in the existing CoMP, a 2-bit size field is enough to indicate QCL information. Yet, if CoMP and FD-MIMO are applied together like FIG. 9, 3 or more CSI-RSs are configured for a UE. In FIG. 9, it can be observed that total 12 BF CSI-RSs are configured to the UE. Hence, the current 2-bit size PQI field is not enough to indicate one of the 12 BF CSI-RSs.

If QCL is established between BF CSI-RSs transmitted by a single TP, although a random CSI-RS transmitted by the single TP is indicated by a PQI only, a UE can perform DM-RS channel estimation. For example, if the UE receives data from TP 1 and the data is transmitted using a beam applied to BF CSI-RS 0, although CSI-RS 1 is indicated through a PQI field, since CSI-RS 0 and CSI-RS 1 are the resources transmitted by the same TP, there is no problem in using QCL information.

On the contrary, if QCL is not established between BF CSI-RSs transmitted by a single TP (this is because large-scale channel attributes may be different as different beams are applied), depending on whether data transmission is performed using a beam of a prescribed BF CSI-RS, the corresponding BF CSI-RS should be accurately indicated as QCL information. Eventually, the current 1-bit size PQI field is not enough to indicate 12 BF CSI-RSs. Such a problem may be solved by increasing the PQI field size. If so, a control overhead increase due to an increase of a DCI size is inevitable. To solve such a problem by minimizing the control overhead increase, a new QCL, information transfer scheme is proposed.

According to an embodiment of the present invention, a base station defines a representative CSI-RS per CSI process configured for a UE for a UE one by one using a PQI field. For example, CSI-RS 0 that is a representative CSI-RS of CSI process 0, CSI-RS 4 that is a representative CSI-RS of CSI process 1, and CSI-RS 8 that is a representative CSI-RS of CSI process 2 are configured for PQI state 0, PQI state 1 and PQI state 2 through RRC signaling, respectively.

Or, a QCL CSI process index can be defined in a PQI state instead of a QCL CSI-RS index. In this case, QCL CSI-RS may be used for a random CSI-RS in a CSI process to obtain QCL information, or a previously agreed CSI-RS index, e.g., a lowest CSI-RS index in a CSI process may be used for QCL, information acquisition.

The UE checks the representative CSI-RS through the PQI field, checks a CSI process having the representative CSI-RS belong thereto, and checks a CRI fed back in the CSI process most recently. The UE performs DM-RS channel estimation by obtaining QCL information through CSI-RS connected to the corresponding CRI. For example, if CSI-RS 0 is indicated by the PQI field, the UE checks a most recently fed-back CRI of the CSI process 0 before receiving a PQI.

Figure 10:
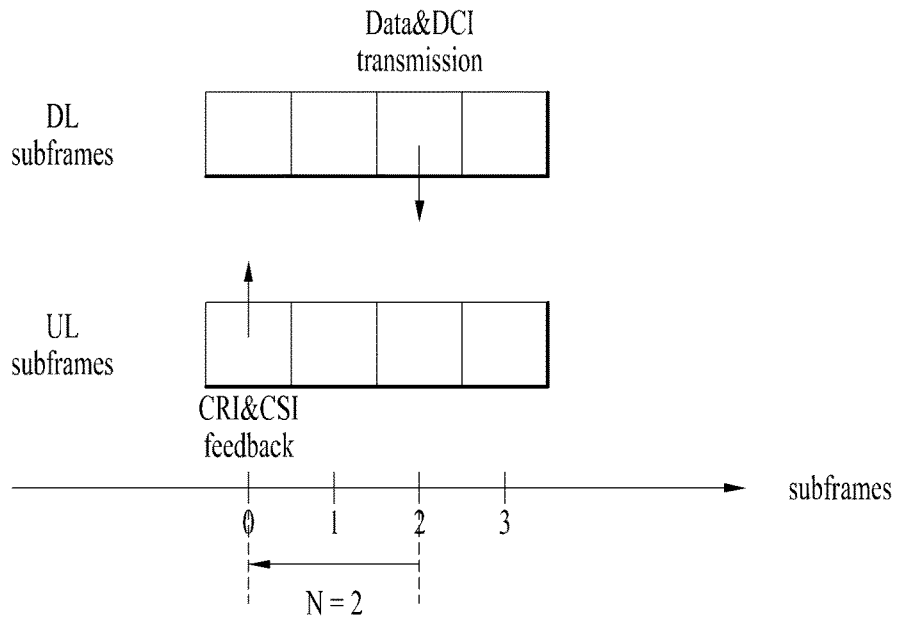
FIG. 10 shows an aperiodic CSI feedback through PUSCH and an example of performing a PDSCH transmission based on it according to an embodiment of the present invention.

FIG. 10 shows an aperiodic CSI feedback through PUSCH and an example of performing a PDSCH transmission based on it according to an embodiment of the present invention.

Referring to FIG. 10, it can be observed that DL data (PDSCH) and DCI are transmitted in SF (subframe) 2 and that PQI in the DCI indicates CSI-RS 0. In this case, since CRI and CSI of CSI process 0 are most recently reported in SF 0 through PUSCH, a UE determines QCL CSI-RS with reference to CRI reported in SF 0. If the CRI reported in SF 0 indicates CSI-RS 3, the UE performs channel estimation using QCL information of CSI-RS 3.

In FIG. 10, if CRI and CSI are reported in SF 1, the UE determines QCL CSI-RS with reference to CRI of SF 1. In this case, the following problem is caused. A base station is unable to perform data scheduling of SF 2, which is the right next subframe, using the CRI received in SF 1. This is because, in order to perform scheduling using the CRI received in SF 1, a time amounting to N subframe(s) at least is required by considering a time taken to perform the calculation for the scheduling. To solve such a problem, the UE preferably checks a most recently fed-back CRI with reference to a timing point ahead of N subframe(s) before receiving PQI.

In FIG. 10, as N is set to 2 [N=2], with reference to SF 0, i.e., a past timing point including SF 0, QCL CSI-RS is determined using CRI reported in SF 0, which is the most recently fed-back CRI. N may be notified to the UE by the base station through higher layer signaling such as RRC signaling, fixed to a specific value in advance, or reported to the base station by the UE.

If the base station fails in CRI/CSI reception in SF 0, the above operation may cause a problem. To solve this problem, the following operation can be considered.

In case of failing in CRI/CSI reception, a base station does not send data to a UE. The base station succeeds in CRI/CSI reception by performing CRI/CSI feedback triggering again and then sends data to the UE.

Or, in case of failing in CRI/CSI reception, the base station informs the UE of QCL CSI-RS supposed to be used by the UE. For example, if a 1-bit indicator (e.g., a flag bit) is defined in DCI and a value of the indicator is 1, the UE brings QCL information using a representative CSI-RS indicated as PQI. On the contrary, if the value is 0, the UE brings QCL information by checking a most recently fed-back CRI with reference to a timing point ahead of N Subframe(s) before receiving PQI.

Or, the UE can perform BD (blind detection) on QCL CSI-RS. Namely, the UE obtains QCL information by blind-detecting one of CSI-RS of a most recently fed-back CRI with reference to a timing point ahead of N Subframe(s) before receiving PQI and a representative CSI-RS indicated by PQI, which can be regarded as selected by the UE eventually.

Figure 11:
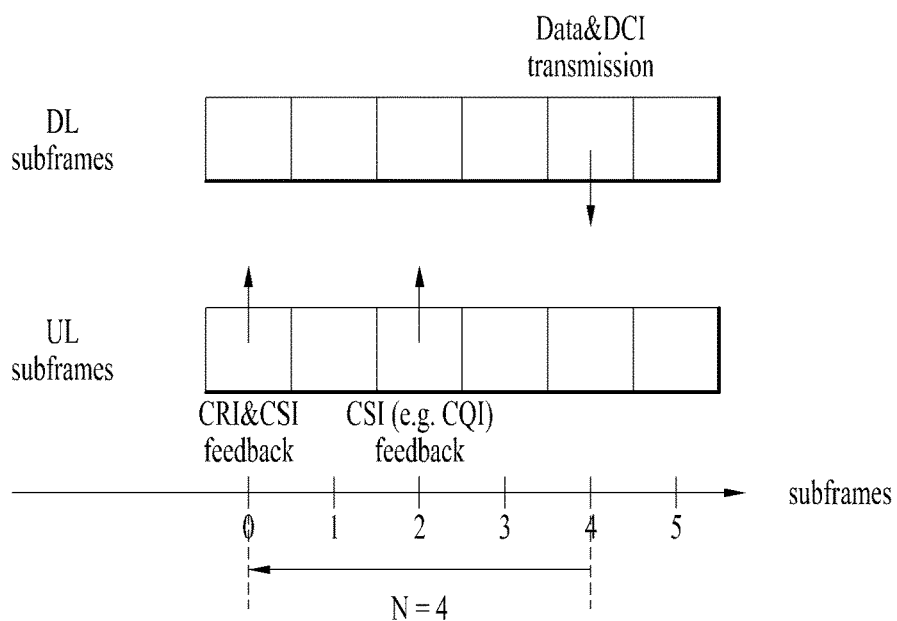
FIG. 11 shows an aperiodic CSI feedback through PDSCH and an example of performing a PDSCH transmission based on it according to an embodiment of the present invention.

FIG. 11 shows an example of performing a periodic CSI feedback through PDSCH and a PDSCH transmission based on it according to an embodiment of the present invention.

Unlike PUSCH of FIG. 10, it can be observed that PUCCH is transmitted in a manner that CRI and the rest CSI are separated. Hence, N is preferably set to a value different from that the N of FIG. 10. In FIG. 11, when N=2, if DL data is transmitted in an SF3 timing, a UE searches for QCL information with reference to CRI of SF 0. Yet, since a base station receives CQI and PMI corresponding to the CRI in an SF2 timing, it causes a problem that data scheduling cannot be performed using the CRI and CSI.

To solve such a problem, in case of performing scheduling with reference to PUCCH CSI feedback, N (i.e., N of FIG. 11) can be determined as a function of a CQI period, a subframe offset of CRI over CQI, and an N value (i.e., N of FIG. 10) of PUSCH CSI feedback.

As the CoMP environment is assumed in the above proposal, PQI information is necessary. In case of a non-CoMP environment or in case that a single TP is fixed, PQI information is not necessary. Hence, in this case, it is possible to override PQI information for other usages. To this end, a base station can signal whether to use PQI by the proposed or existing scheme or override PQI for other usages, through higher layer signalling such as RRC signalling. For example, if the base station configures QCL type A or a single CSI process, PQI is used by being overridden for other usages.

Additionally, it is necessary to define a method of defining a new QCL type as well. Yet, it may require an assumption of QCL, between CSI-RS resources in a CSI process.

Particularly, if BF CSI-RSs transmitted by a single TP in the examples of FIG. 9 and Table 3, i.e., BF CSI-RSs defined in a single CSI process are QCLed, the UE can assume that a random CSI-RS configured in the CSI process and a DM-RS are QCLed. In this case, the base station informs the UE of the single CSI process through DCI and the like and the UE can assume the QCL between the random CSI-RS configured in the CSI process and the DM-RS. Or, the UE receives a QCL CSI-RS index through DCI conventionally and is able to assume the QCL between the random CSI-RS configured in the CSI-RS existing CSI process and the DM-RS. Such a QCL type is defined as a QCL type C.

Since several QCLed CSI-RSs exist in a CSI process according to QCL type C, reference signal density for a UE to calculate QCL information is higher than that of the existing QCL type B. For example, in QCL type B, there exists a single QCL CSI-RS by a minimum period of 5 ms. Yet, in QCL type C, as 5 CSI-RSs are configured in a single CSI process, there exist 5 QCL CSI-RSs. These 5 CSI-RSs have the period of 5 ms and different subframe offsets.

In this case, a UE having QCL type C configured thereto can accurately estimate Doppler spread and Doppler shift using QCL CSI-RS existing in every subframe. Eventually, the UE does not need to obtain QCL information from CRS but is able to perform DM-RS estimation by acquiring accurate QCL information with CSI-RS only.

Figure 12:
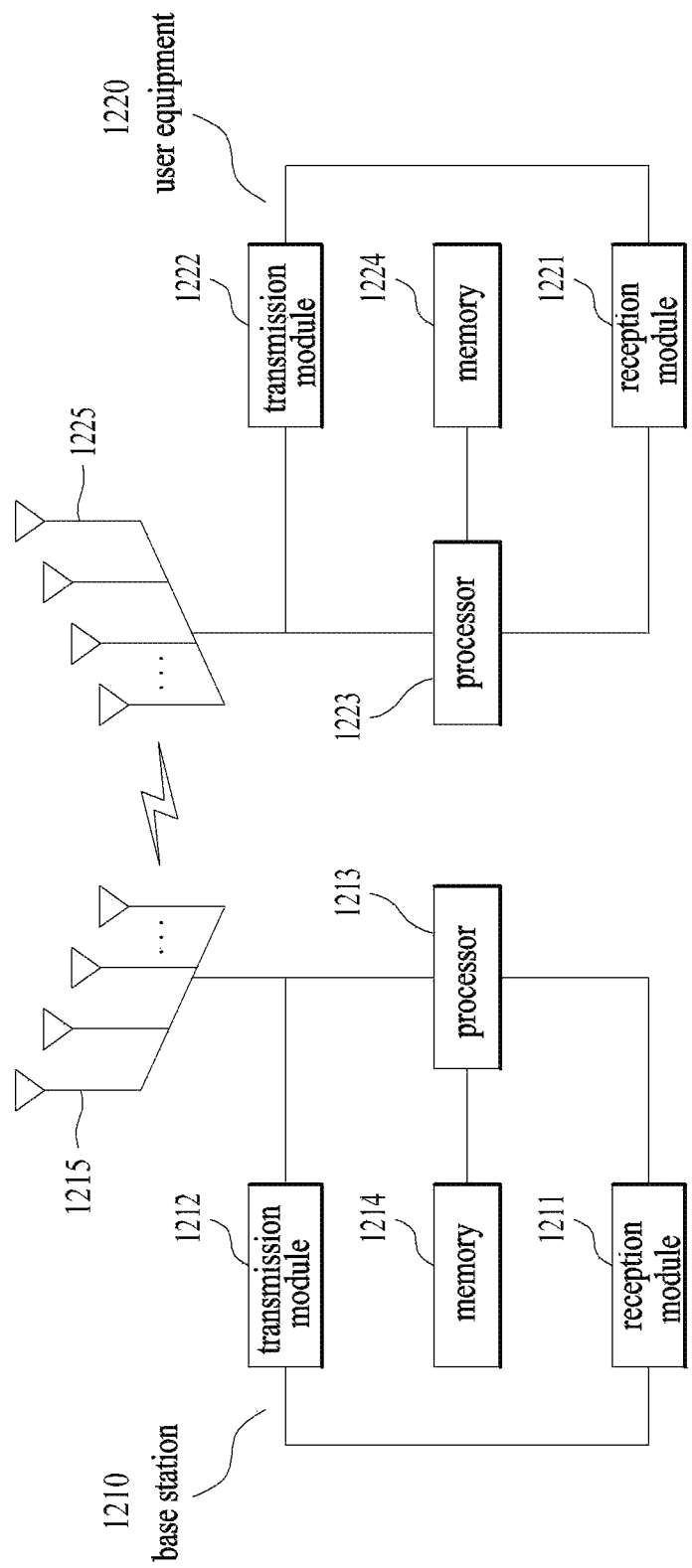
FIG. 12 is a diagram for a configuration of a base station and a user equipment applicable to one embodiment of the present invention.

FIG. 12 is a diagram for a base station and a user equipment capable of being applied to an embodiment of the present invention.

Referring to FIG. 12, a wireless communication system includes a base station (BS) 1210 and a user equipment (UE) 1220. The BS 1210 includes a processor 1213, a memory 1214 and a radio frequency (RF) units 1211/1212. The processor 1213 can be configured to implement the proposed functions, processes and/or methods. The memory 1214 is connected with the processor 1213 and then stores various kinds of information associated with an operation of the processor 1213. The RF units 1211/1212 are connected with the processor 1213 and transmits and/or receives a radio signal.

The user equipment 1220 includes a processor 1223, a memory 1224 and a radio frequency (RF) unit 1221/1222. The processor 1223 can be configured to implement the proposed functions, processes and/or methods. The memory 1224 is connected with the processor 1223 and then stores various kinds of information associated with an operation of the processor 1223. The RF unit 1221/1222 is connected with the processor 1223 and transmits and/or receives a radio signal. The base station 1210 and/or the user equipment 1220 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention can be used for a wireless communication device such as a terminal, a relay, a base station and the like.

What is claimed is:

1. A method of receiving a downlink signal by a user equipment in a wireless access system, the method comprising:
receiving information on a plurality of CSI (channel status information) processes, wherein each of the plurality of CSI processes includes two or more CSI-RSs (channel status information-reference signals);
receiving a downlink control signal including a flag of a 1-bit size and an indicator indicating a specific CSI-RS;
selecting a QCL (quasi co-located) CSI process having the specific CSI-RS set as a representative CSI-RS from the plurality of CSI processes;
selecting a QCL CSI-RS of a DM-RS (demodulation-reference signal) based on the flag; and
receiving a downlink data signal using the DM-RS and the QCL CSI-RS,
wherein a CSI-RS corresponding to a most recently reported CSI-RS indicator among the two or more CSI-RSs included in the QCL CSI process is selected as the QCL CSI-RS of the DM-RS based on that the flag has a first value, and
wherein the specific CSI-RS is selected as the QCL CSI-RS of the DM-RS based on that the flag has a second value.

2. The method of claim 1, wherein the representative CSI-RS has a smallest index among the two or more CSI-RSs included in the corresponding CSI process.

3. The method of claim 1, wherein the DM-RS and the QCL CSI-RS are equal to each other in a Doppler spread, a Doppler shift, an average delay and a delay spread.

4. The method of claim 1, wherein the plurality of CSI processes correspond to different TPs (transmission points).

5. The method of claim 1, wherein an index of a subframe for reporting the CSI-RS indicator precedes an index of a subframe for receiving the downlink control signal with a preset value.

6. A user equipment in a wireless access system, the user equipment comprising:
a wireless communication part; and
a processor coupled with the wireless communication part, and configured to receive information on a plurality of CSI (channel status information) processes, wherein each of the plurality of CSI processes includes two or more CSI-RSs (channel status information-reference signals), receive a downlink control signal including a flag of a 1-bit size and an indicator indicating a specific CSI-RS, select a QCL (quasi co-located) CSI process having the specific CSI-RS set as a representative CSI-RS from the plurality of CSI processes, select a QCL CSI-RS of a DMRS (demodulation-reference signal) based on the flag, and receive a downlink data signal using the DM-RS and the QCL CSI-RS,
wherein a CSI-RS corresponding to a most recently reported CSI-RS indicator among the two or more CSI-RSs included in the QCL CSI process is selected as the QCL CSI-RS of the DM-RS based on that the flag has a first value, and
wherein the specific CSI-RS is selected as the QCL CSI-RS of the DM-RS based on that the flag has a second value.

7. The user equipment of claim 6, wherein the representative CSI-RS has a smallest index among the two or more CSI-RSs included in the corresponding CSI process.

8. The user equipment of claim 6, wherein the DM-RS and the QCL CSI-RS are equal to each other in a Doppler spread, a Doppler shift, an average delay and a delay spread.

9. The user equipment of claim 6, wherein the plurality of CSI processes correspond to different TPs (transmission points).

10. The user equipment of claim 6, wherein an index of a subframe for reporting the CSI-RS indicator precedes an index of a subframe for receiving the downlink control signal with a preset value.

* * * * *